2,997,483
CYCLODODECATRIENE MONOEPOXIDE-ADDUCTS
Roy A. Gray, Bartlesville, Okla., assignor to Phillips Petroleum Company, a corporation of Delaware
No Drawing. Filed July 24, 1959, Ser. No. 829,229
6 Claims. (Cl. 260—348)

This invention relates to the preparation of an adduct of cyclododecatriene monoepoxide. In one of its aspects, the invention relates to the preparation of an adduct of 1,5,9-cyclododecatriene 1,2-monoepoxide

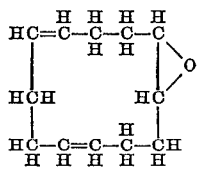

by reacting the same with silver nitrate. In a further aspect of the invention, it relates to the adduct prepared as herein described. In a still further aspect of the invention, it relates to the recovery of cyclododecatriene monoepoxide from mixtures containing the same by reacting the monoepoxide in the mixture with silver nitrate as described herein, and recovering the adduct thus produced. In a further aspect of the invention, it relates to a method of causing a reaction between cyclododecatriene monoepoxide and silver nitrate under conditions described herein. In a further aspect still, the invention relates to the regeneration of cyclododecatriene monoepoxide by decomposition of the adduct prepared according to the invention. In a still further aspect of the invention, it relates to the purification of an adduct of cyclododecatriene monoepoxide by recrystallization of the same from a solution of it prepared in a solvent therefor, such as ethyl alcohol, according to the invention.

It has now been discovered that the monoepoxide of cyclododecatriene, namely, cyclododecatriene monoepoxide, will react with silver nitrate, as herein described, to form a unimolecular adduct product. It has been found that this product can be formed by reaction of cyclododecatriene monoepoxide in mixtures containing the same. Further, it has been found that the adduct is soluble in certain solvents, such as ethyl alcohol, from which it can be recrystallized to obtain it in substantially pure form.

It is an object of this invention to prepare a cyclododecatriene monoepoxide-silver nitrate adduct. It is another object of this invention to provide said adduct. It is a further object of this invention to provide a modus operandi for the purification of a cyclododecatriene monoepoxide-adduct. It is a further object still to purify or to further purify cyclododecatriene monoepoxide by regenerating the same from a new chemical complex or adduct.

Other aspects, objects, and the several advantages of this invention are apparent from a study of this disclosure and the appended claims.

According to this invention, cyclododecatriene monoepoxide reacts with silver nitrate to form a unimolecular chemical complex. The complex which is formed, is formed at a temperature preferably below 70° C. and still more preferably below 50° C. Somewhat higher temperature can be employed but this is now definitely not preferred. The concentration of the metal salt solution which is employed preferably should contain at least about 20 weight percent, more preferably about 50 weight percent or more of the metal salt.

G. Wilke in Angew. Chem. 69, 397–8 (1957) discloses that butadiene can be trimerized in 80 percent yield to trans, trans, cis-1,5,9-cyclododecatriene. This trimerization is carried out by means of a catalyst system comprising an organoaluminum such as triethylaluminum in conjunction with a metal halide such as titanium tetrachloride. The cyclic triene formed has a melting point of 18° C. and boils at 100 to 101° C. at 11 mm. mercury absolute pressure. The synthesis of cyclic olefins by this route offers many possibilities in the field of chemical synthesis. One compound which was prepared by Wilke in the above cited reference is the monoepoxide of cyclododecatriene. The monoepoxide of cyclodecatriene also offers many possibilities in the field of chemical synthesis. For example, this compound can be converted to a diol by breaking the oxirane ring and hydrolyzing simultaneously. It is also possible to hydrogenate the monoepoxide to cyclododecanol, and subsequently dehydrogenate this compound to form cyclododecanone. This saturated cyclic ketone can then be converted to an oxime by reaction with hydroxylamine, and this oxime can then be rearranged to form a lactam. This lactam can then be polymerized to form polyamides.

The present invention finds its utility at least in the provision of modus operandi for the recovery and purification of the cyclododecatriene monoepoxide.

The amount of silver nitrate which is used preferably should be at least one mol per mol of cyclododecatriene monoepoxide with which it is being reacted, and it is preferred to use an excess, as for example, two mols or higher on the same basis. As these two reactants are brought together, a white precipitate forms immediately, this precipitate being a 1:1 molar complex of cyclododecatriene monoepoxide and silver nitrate. Of course, if other than equimolar amounts of the reactants are used, the reaction mass will contain unreacted reactant which is in excess. After precipitation is completed, the solid complex can be recovered by such means as filtration, decantation, centrifugation, and the like. This complex is soluble in hot alcohols, but insoluble in cold alcohols.

According to the invention, as earlier indicated, the 1:1 molar complex of cyclododecatriene monoepoxide and silver nitrate can be decomposed to regenerate the epoxide by admixing the solid complex with boiling water and/or steam. As the epoxide is regenerated, it separates from the silver nitrate solution as an organic phase and can be separated off by any suitable method. The formation of the complex and its subsequent decomposition to regenerate the epoxide provides an excellent method for separating and purifying cyclododecatriene monoepoxide. For example, the effluent from a catalytic trimerization of butadiene to form cyclododecatriene is then treated as disclosed in the art in a manner so as to recover the cyclododecatriene. This cyclododecatriene can then be reacted with a peroxygen-containing compound such as peracetic acid to form the monoepoxide of cyclododecatriene. The product from this reaction can then be treated with a 50 percent by weight aqueous silver nitrate solution at a temperature of 25° C. This results in the formation of the solid complex, which precipitates immediately. The precipitate can then be recovered by filtration, after which it can be washed several times with cold ethyl alcohol to remove traces of silver nitrate from the solid complex. This solid complex can be then stored until such time it is desired to regenerate cyclododecatriene monoepoxide. The monoepoxide can be regenerated by agitating the solid complex in boiling water. As the monoepoxide is regenerated, the organic phase can be separated off, purified by a suitable method such as extraction and dried before it is used in further chemical synthesis.

The following specific examples are intended to illustrate certain embodiments of this invention, but it is not intended that the invention be limited to the particular embodiments shown therein. It will be understood that the invention includes generally the adducts formed with the metal salts disclosed herein.

*Example*

A run was carried out in which cyclododecatriene monoepoxide was prepared and reacted with silver nitrate. In this run, three grams of sodium acetate containing three mols of water of hydration was dissolved in 57.0 grams of 40 percent by weight peracetic acid. This solution was then added, with vigorous stirring, to 48.6 grams of cyclododecatriene which had been prepared by the trimerization of butadiene in the presence of a catalyst system comprising triethylaluminum and titanium tetrachloride. The addition of the peracid solution to the cyclic triene required two hours. During the addition of the peracid, the temperature was maintained at 20 to 25° C. by cooling, since the reaction was exothermic. At the end of the reaction period, a saturated aqueous solution of sodium chloride was then added to the reaction mixture, and an organic layer separated. This organic layer was removed and diluted with ether, and the ether solution was then washed with additional saturated sodium chloride solution. The ether solution was then washed with an aqueous solution of sodium carbonate, followed by a wash with aqueous ferrous ammonium sulfate solution. The organic material was then dried over sodium sulfate. After the ether was evaporated off, the colorless material remaining was then fractionated.

A fraction which boiled at 72° C. at 0.3 mm. mercury absolute pressure was analyzed and found to contain 78.84 weight percent carbon, 10.02 weight percent hydrogen, 9.3 weight percent total oxygen and 8.4 weight percent oxirane oxygen. This material which was not all of the monoepoxide recovered had a refractive index of 1.5062 at 20° C. This compares well with the properties given for cyclododecatriene monoepoxide in Belgian Patent 567,041, Example I, namely, B.P. at 0.5 mm. Hg: 68–71° C., and $n_D^{20} = 1.5060$.

As further proof that the monoepoxide was formed by the peroxidation of cyclododecatriene, an 0.1890 gram portion of the above-described fraction was dissolved in ethyl alcohol and hydrogenated in a microhydrogenation apparatus at 24.5° C. and 747 mm. mercury absolute pressure, in the presence of a palladium on charcoal catalyst, the sample taking up 55.2 cc. of hydrogen. Converting this volume to standard conditions, this is a hydrogen/cyclic compound mol ratio of 2.09.

Another microhydrogenation run was carried out utilizing a platinum hydrogenation catalyst. In this run, 0.1757 gram sample of the above-described fraction was hydrogenated at 24.5° C. and 747 mm. mercury absolute pressure. The amount of hydrogen taken up was 51.2 cc. This volume at standard conditions is a hydrogen/cyclic compound mol ratio of 2.09. The above microhydrogenation runs indicate that two double bonds were present in the cyclic compound being hydrogenated.

In still another run, another sample of the above-described fraction was hydrogenated in the presence of Raney nickel at 190° C. and 1,300 p.s.i. At these conditions, the oxirane oxygen, if present, would be converted to a hydroxy group. White crystals resulted from the hydrogenation, and these crystals, after recrystallization from acetone, had a melting point of 74–75° C. According to the Journal of American Chemical Society 78, 2735–9 (1956), the melting point of cyclododecanol is 75–76° C.

A. A small amount of this fraction was then added to a 50 percent aqueous silver nitrate solution at room temperature. A white precipitate formed immediately.

B. In another run, ½ milliliter of the said fraction was added to 2 milliliters of 50 percent by weight aqueous silver nitrate. The white precipitate which formed immediately was filtered out and recrystallized from ethyl alcohol.

This white solid was insoluble in cold water. An analysis of the solid showed it to contain 31.2 weight percent silver, which compares with the calculated silver content for $C_{12}H_{18} \cdot AgNO_3$ of 31.0 weight percent. Thus, it is obvious that the complex which was prepared was a 1:1 complex of silver nitrate and cyclododecatriene monoepoxide. When this material was heated in water, it decomposed to give an oil layer, which had a refractive index of 1.5052 at 20° C. and an infrared spectra identical with that of the original monoepoxide.

The above chemical reactions and analyses thus prove that cyclododecatriene was converted to cyclododecatriene monoepoxide, and, therefore, that a new composition of matter comprising a 1:1 molar complex of cyclododecatriene monoepoxide and silver nitrate has been formed.

The conditions for the reaction and purification described above in connection with silver nitrate will, as one skilled in the art in possession of this disclosure will understand, be essentially analogous in the case of the other metal salts described herein as forming adducts with the cyclododecatriene monoepoxide.

In addition to its solubility in ethyl alcohol, the adduct of the invention is soluble in and can be recrystallized from methyl alcohol isopropyl alcohol, and acetone.

Reasonable variation and modification are possible within the scope of the foregoing disclosure and the appended claims to the invention, the essence of which is that cyclododecatriene monoepoxide can be recovered from a mixture containing the same by forming an adduct thereof, using silver nitrate as described herein, that said adduct can be purified by dissolving the same in a selected solvent, such as alcohol and recrystallizing the same from said solvent and further that essentially pure cyclododecatriene monoepoxide can be regenerated from the adduct, all as set forth and described herein.

I claim:

1. The preparation of 1,5,9-cyclododecatriene-1,2-monoepoxide-silver nitrate adduct which comprises contacting 1,5,9-cyclododecatriene 1,2-monoepoxide at a temperature below about 70° C. with an aqueous solution of silver nitrate and separating a thus-formed white precipitate.

2. A method of purifying 1,5,9-cyclododecatriene 1,2-monoepoxide which comprises contacting the same at a temperature below about 70° C. with an aqueous solution of silver nitrate, thus forming an adduct, separating the adduct, dissolving the adduct in a solvent therefor from which it can be recrystallized, and recrystallizing the adduct from said solvent.

3. A method of obtaining purified 1,5,9-cyclododecatriene 1,2-monoepoxide which comprises converting the same to a metal salt adduct by contacting the same with silver nitrate at a temperature below about 70° C. and then decomposing said adduct by heating the same to its decomposition temperature in the presence of water to obtain an oily layer and separating said oily layer.

4. A method of purifying 1,5,9-cyclododecatriene 1,2-monoepoxide which comprises causing the same to contact silver nitrate to form a unimolecular 1,5,9-cyclododecatriene 1,2-monoepoxide-silver nitrate adduct and then heating the adduct thus formed to its decomposition temperature in the presence of water to obtain an oily layer and separating the oily layer thus formed.

5. A method of purifying 1,5,9-cyclododecatriene 1,2-monoepoxide which comprises converting the same by contacting the same with aqueous silver nitrate having a concentration of at least about 20 weight percent, thus obtaining cyclododecatriene monoepoxide-silver nitrate adduct, separating said adduct, dissolving the same in ethyl alcohol, recrystallizing the same from ethyl alcohol, and then heating the same in the presence of water to the decomposition temperature of said adduct to obtain substantially pure cyclododecatriene monoepoxide.

6. 1,5,9-cyclododecatriene 1,2-monoepoxide-silver nitrate adduct.

References Cited in the file of this patent

Cope et al.: Chem. Abs., vol. 44, pages 9926–7 (1950).
Francis: Chem. Abs., vol. 44, page 4486 (1950).